(12) United States Patent
Lin

(10) Patent No.: US 6,597,786 B1
(45) Date of Patent: Jul. 22, 2003

(54) HEADSET/HAND-FREE OPERATING MODE SELECTING AND SWITCHING SYSTEM FOR TELEPHONE

(76) Inventor: Kuan-Nong Lin, 3Rd Floor, No. 42, Lane 80, Nan Kang Road, Section 3, Taipei (TW)

( * ) Notice: Subject to any disclaimer, the term of this patent is extended or adjusted under 35 U.S.C. 154(b) by 0 days.

(21) Appl. No.: 09/574,248

(22) Filed: May 19, 2000

(51) Int. Cl.[7] .............................................. H04M 1/00
(52) U.S. Cl. ................................................ 379/388.02
(58) Field of Search ....................... 379/420.04, 428.02, 379/430, 388.02; 455/568

(56) References Cited

U.S. PATENT DOCUMENTS 5,191,602 A * 3/1993 Regen et al. ............... 379/430

* cited by examiner

Primary Examiner—Jack Chiang
(74) Attorney, Agent, or Firm—Dennison, Schultz & Dougherty

(57) ABSTRACT

A headset or hand-free operating mode selecting and switching system for telephone is provided. The system mainly includes a circuit for a main unit of the telephone into which a headset connection detecting system and a single hand-free/headset button switch are added. By depressing the one single hand-free/headset button switch, the headset connection detecting system is automatically enabled to detect whether a headset is connected to the circuit of the main unit of the telephone. The telephone is automatically set to either the headset or the hand-free operating mode depending on a detected result from the headset connection detecting system. And, depressing of the one single hand-free/headset button switch again automatically disables the previously enabled hand-free or headset mode.

1 Claim, 3 Drawing Sheets

HEADSET/HAND-FREE OPERATING MODE SELECTING AND SWITCHING SYSTEM FOR TELEPHONE

BACKGROUND OF THE INVENTION

The present invention relates to a headset/hand-free operating mode selecting and switching system for telephone, and more particularly to a headset/hand-free operating mode selecting and switching system for telephone that is controlled through only one single button switch. The system mainly includes a circuit for a main unit of the telephone into which a headset connection detecting system and a hand-free/headset button switch are added. By depressing the hand-free/headset button switch, the headset connection detecting system is enabled to automatically detect whether a headset is electrically disconnected from the telephone, or whether there is not any headset connected to the telephone set, so that the telephone can be automatically set to a hand-free or a headset operating mode depending on a detected result.

A multi-functional telephone set currently available in the market usually includes two additional operating modes, namely, a headset mode and a hand-free mode. In the headset mode, a user may talk over the phone without holding a handset thereof simply by putting on a headset plugged into a headset jack provided on the telephone set. And, in the hand-free mode, a user may talk over the phone without the need to hold the handset or put on the headset. For the user to select to use either the headset or the hand-free operating mode, such multi-functional telephone set is usually provided with at least two separate button switches with which the user select and switch between the headset and the hand-free operating modes. That is, when the user wishes to talk over the phone in the hand-free mode, one of the at least two button switches, that is, a hand-free button switch, must be depressed to enable the hand-free operating mode of the telephone. The same hand-free button switch must also be depressed when the talk ends, in order to resume the telephone set to a normal operating mode. And, when the user wishes to talk over the phone in the headset mode, a headset is first plugged into the headset jack on the telephone set and then another one of the at least two button switches, that is, a headset button switch, is depressed to enable the headset operating mode of the telephone. In brief, on a conventional multi-functional telephone set, there are at least two separate mode-selection keys in addition to other keys for basic functions of the telephone. And, these at least two separate mode-selection keys must be separately depressed to select a desired operating mode, namely, the headset mode or the hand-free mode. These additional mode-selection keys inevitably increase the manufacturing cost of the telephone set, and it is troublesome for the user to pay attention to select a correct mode-selection key between two such keys before the operating mode of the telephone set can be switched.

Generally, a user who needs to continuously talk over phone for a prolonged time, such as a telephone operator, or a user who needs to talk over phone while handling other work with hands, such as a stock operator, will usually select the headset mode. For these people, when they plugs a headset into the headset jack on the phone set, it means they are to use the headset mode of the phone, and it is really troublesome for them to further depress a button switch to enter into the headset mode. And, when they do not use the headset, they can simply put off the headset. It would be really unnecessary for them to further depress a button switch to disable the headset mode.

Therefore, it is tried by the inventor to develop a simplified headset/hand-free operating mode selecting and switching system for telephone, so that a user may conveniently select and switch between the headset and the hand-free modes simply by depressing one single button switch on the phone.

SUMMARY OF THE INVENTION

A primary object of the present invention is to provide an improved telephone operating mode selecting and switching system, in which a single button switch and a headset connection detecting system are included. By depressing the one single button switch, the headset connection detecting system is automatically enabled to detect whether headset switches provided on the telephone set are disconnected or not, or whether there is not any headset connected to the telephone set. And, the telephone set will be automatically switched to a headset-enabled status or a hand-free-enabled status, depending on a detected result from the headset connection detecting system. And, when the one single button switch is depressed again, the previously enabled status is automatically ended. The selecting and switching between the headset and the hand-free modes of a telephone set is therefore largely simplified.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
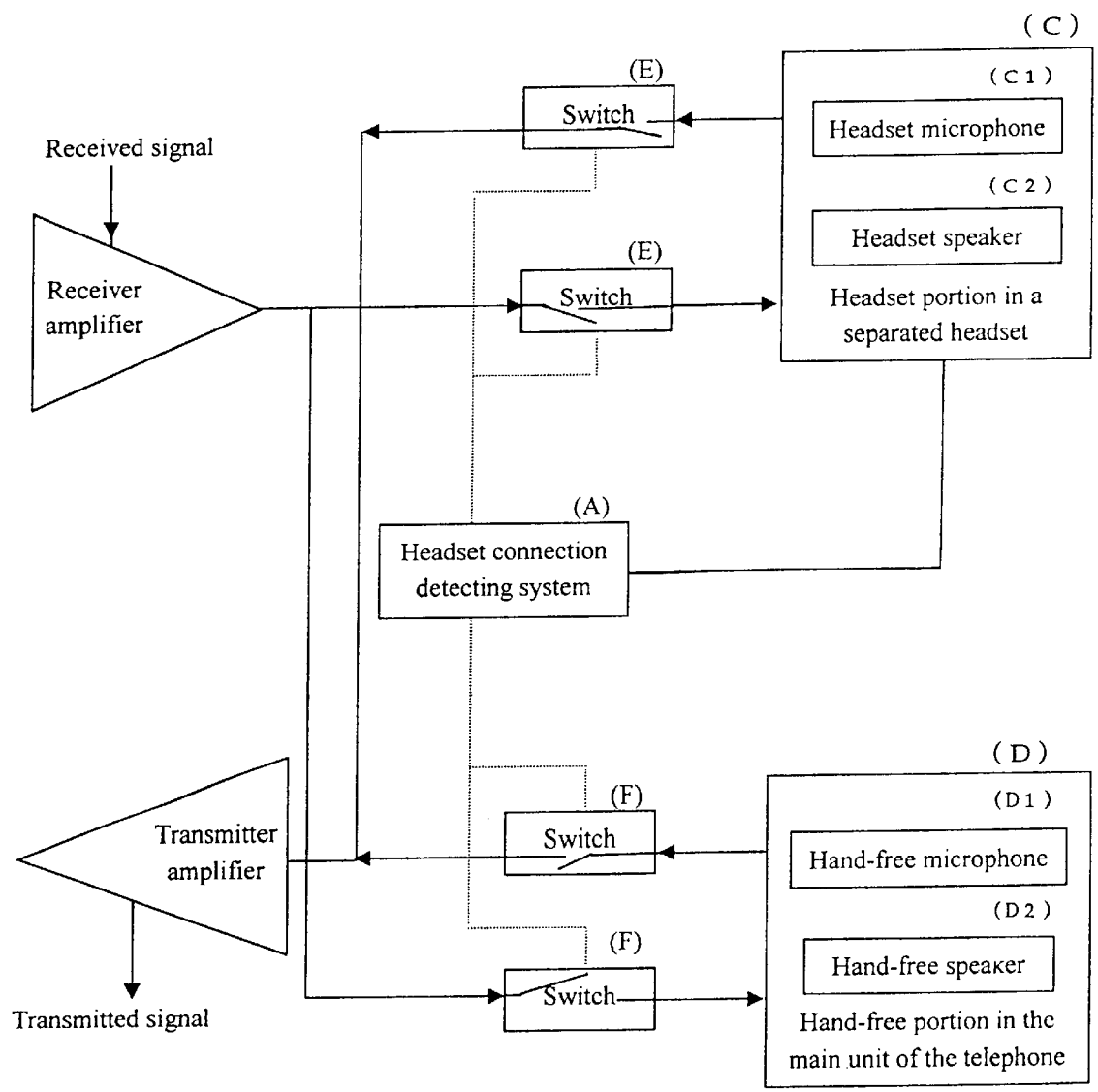
FIG. 1 is a block diagram of the electric circuit of the present invention.

Please refer to FIG. 1 that is a block diagram showing a circuit of a headset/hand-free operating mode selecting and switching system for telephone according to the present invention. According to this system, a headset connection detecting system (A) and a hand-free/headset button switch (B) (see FIG. 2) are provided in a circuitry for a main unit of the telephone. In the overall circuitry of the telephone, there is also provided a headset portion (C) that is included in a separated headset and a hand-free portion (D) that is included in the main unit of the telephone. The headset portion (C) further includes a headset microphone (C1) and a headset speaker (C2), each of which is connected to a switch (E) provided on the main unit of the telephone. The hand-free portion (D) also further includes a hand-free microphone (D1) and a hand-free speaker (D2), and each of which is connected to a switch (F) provided between them and the circuitry of the main unit of the telephone. There are lines extended from the headset connection detecting system (A) to the switches (E) and (F) for the system (A) to detect a connection status of the switches (E) or (F).

When the headset portion (C) is plugged into the main unit of the telephone, it means the switches (E) are in an "ON" status. On the other hand, when the headset portion (C) is not plugged into the main unit of the telephone, it means the switches (E) are in an "OFF" status. The headset connection detecting system (A) is able to detect the exact status of the switches (E). And, either the headset or the hand-free operating mode of the telephone is automatically enabled based on a detected result from the headset connection detecting system (A).

Figure 2:
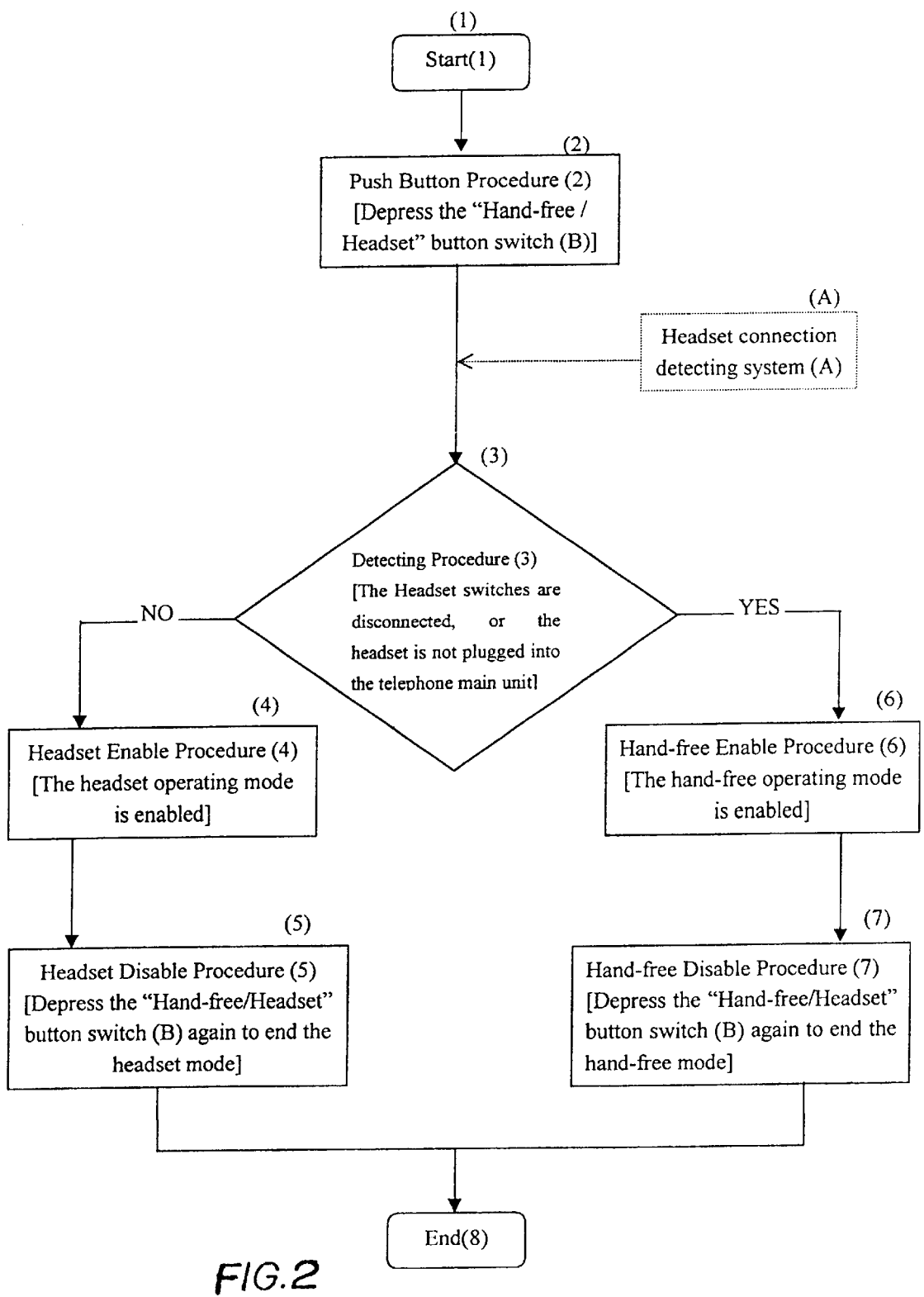
FIG. 2 is a block diagram showing the procedures included in the headset/hand-free operating mode selecting and switching system of the present invention.

FIG. 2 is a block diagram showing procedures included in the headset/hand-free operating mode selecting and switching system of the present invention. First, in a Start procedure 1, the telephone is set to an active status. Second, in a Push Button procedure 2, the hand-free/headset button switch (B) is depressed to enter into a Detecting procedure 3. In the Detecting procedure 3, the headset connection detecting system (A) automatically detects whether the headset switches (E) are not disconnected, or whether there is not any headset plugged into the telephone. In the event a user wants to use a headset while the headset portion (C) has already been plugged into the main unit of the telephone, it means the headset switches (E) are not in the disconnected status. Thus, a detected result from the Detecting procedure 3 is "NO". In this case, a Headset Enable procedure 4 follows. In this procedure 4, the headset mode is enabled and the user could talk over the telephone through the headset. When the talk ends, a Headset Disable procedure 5 follows. In this procedure 5, simply depress the Hand-free/Headset button switch (B) and the previously enabled headset mode is disabled and an End procedure 8 follows. In the event the user wants to use the phone in a hand-free mode and the headset portion (C) is not plugged into the main unit of the telephone, that is, the headset switches (E) are disconnected, the user may simply set the telephone to the "ON" status (the procedure 1) and then depress the hand-free/headset button switch (B) (the procedure 2) just as in the case described earlier. At this point, the headset connection detecting system (A) detects and the telephone enters into the Detecting procedure 3 and a detected result from the headset connection detecting system (A) is "YES", that is, the headset switches (E) are disconnected (or no headset is plugged into the telephone set). With this detected result of "YES", the telephone enters into a Hand-free Enable procedure 6, representing the hand-free mode of the telephone is enabled and the user may talk over the phone in the hand-free mode. When the talk ends, simply depress the Hand-free/Headset button switch (B) again for the telephone to enter into a Hand-free Disable procedure 7. And then, the End procedure 8 follows.

From the above description, it can be found that the present invention allows easy selecting and switching by a phone user between the Hand-free and the Headset operating modes simply by adding a headset connection detecting system (A) and one single Hand-free/Headset button switch (B) into the telephone circuit. A telephone set with the headset connection detecting system (A) and the Hand-free/Headset button switch (B) is apparently more practical for use.

Figure 3:
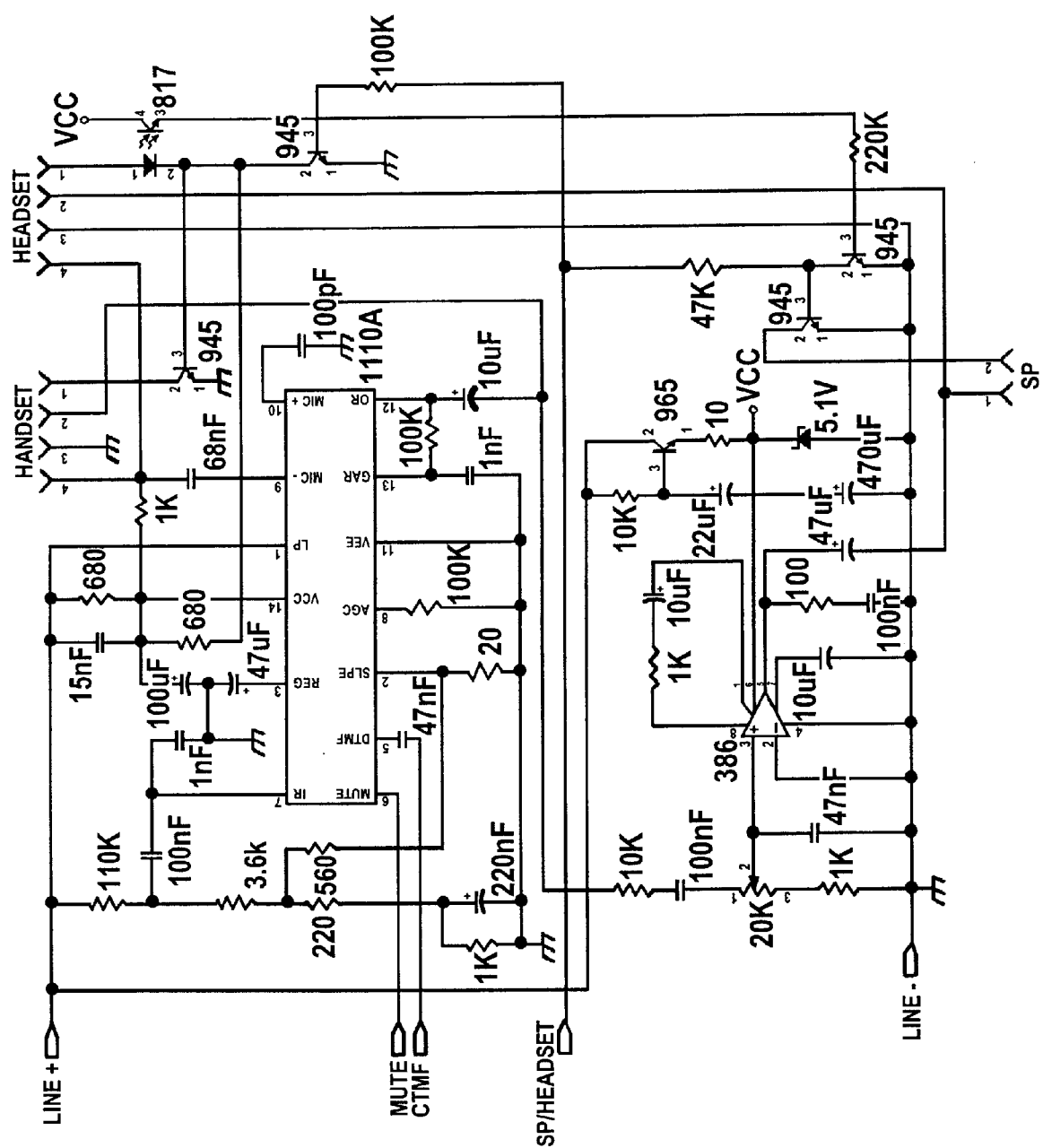
FIG. 3 is a circuit diagram for an embodiment of the present invention.

FIG. 3 illustrates an exemplified circuit diagram for a telephone set incorporating the headset connection detecting system (A) and the Hand-free/Headset button switch (B) of the present invention. From this circuit diagram, it can be proven that the present invention is effective and practical for use.

The present invention is an IC-based electronic circuit design. And, it is understood that many changes and modifications in the specifications of components or the circuit arrangements of an electronic circuit can be carried out without departing from the scope of the present invention that is intended to be limited only by the appended claims.

What is claimed is:

1. A headset/hand-free operating mode selecting and switching system for a telephone comprising:

a telephone having a main unit and a telephone circuit in said main unit, said telephone circuit including a headset connection detecting system and a single hand-free/headset button to enable a phone user to conveniently select and switch between a hand-free and a headset operating mode of said telephone prior to talking over said telephone;

said telephone circuit also including a hand-free portion in said main unit of said telephone and said hand-free portion including a hand-free microphone, a hand-free speaker and a first switch connecting said hand-free microphone to said headset connection detecting system and a second switch connecting said hand-free speaker to said headset connection detecting system;

a separated headset and a headset portion disposed in said separated headset and said headset portion including a headset microphone and a third switch connecting said headset microphone to said headset connection detecting system and said headset portion also including a headset speaker and a fourth switch connecting said headset speaker to said headset connection detecting system; whereby when said one single hand-free/headset button switch is depressed, said headset connection detecting system is enabled to automatically detect whether said headset microphone and speaker switches are disconnected or whether said telephone is not connected to a headset, and said headset or said hand-free mode of said telephone is automatically enabled depending on a detected result from said headset connection detecting system, and when said one single hand-free/headset button switch is depressed again, said headset or said hand-free mode of said telephone previously enabled is now disabled.

* * * * *